(12) United States Patent
Furuta

(10) Patent No.: US 12,480,540 B2
(45) Date of Patent: Nov. 25, 2025

(54) ASSEMBLY MEMBER PRODUCTION METHOD INCLUDING STEP FOR FITTING PROTRUDING PART AND RECESSED PART

(71) Applicant: FANUC CORPORATION, Yamanashi (JP)

(72) Inventor: Satoshi Furuta, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 63 days.

(21) Appl. No.: 18/563,524

(22) PCT Filed: Jun. 2, 2021

(86) PCT No.: PCT/JP2021/021079
§ 371 (c)(1),
(2) Date: Nov. 22, 2023

(87) PCT Pub. No.: WO2022/254632
PCT Pub. Date: Dec. 8, 2022

(65) Prior Publication Data
US 2024/0360857 A1    Oct. 31, 2024

(51) Int. Cl.
*F16B 5/06*        (2006.01)
*F16B 5/02*        (2006.01)

(52) U.S. Cl.
CPC ............ *F16B 5/0642* (2013.01); *F16B 5/025* (2013.01)

(58) Field of Classification Search
CPC ...... F16B 5/0642; F16B 5/0664; F16B 5/025; F16B 2/005
See application file for complete search history.

(56) References Cited

U.S. PATENT DOCUMENTS

| | | | | |
|---|---|---|---|---|
| 2,535,100 | A | * | 12/1950 | Sourwine ................... E04C 5/10 236/1 C |
| 2,786,726 | A | * | 3/1957 | Tarr ....................... F16C 33/121 384/387 |
| 2022/0059396 | A1 | * | 2/2022 | Yamaguchi ....... H01L 21/67109 |

FOREIGN PATENT DOCUMENTS

| | | |
|---|---|---|
| CN | 204634145 U | 9/2015 |
| JP | 05012827 U | 2/1993 |

(Continued)

OTHER PUBLICATIONS

English translation of PCT International Search Report dated Aug. 17, 2021 for related International Application No. PCT/JP2021/021079, from which the instant application is based, 2 pgs.

(Continued)

*Primary Examiner* — Kyle A Cook
(74) *Attorney, Agent, or Firm* — Fredrikson & Byron, P.A.

(57) ABSTRACT

This assembly member production method includes a step for disposing a coating agent at the lateral surface of a protruding part of a first member and the lateral surface of a recessed part of a second member so as to be able to be discharged to the outside after the second member is assembled to the first member. The production method includes a step for fitting the protruding part and the recessed part and assembling and fixing the second member to the first member. The production method includes a step for discharging outward the coating agent disposed between the lateral surface of the protruding part and the lateral surface of the recessed part and forming a gap between the protruding part and the recessed part.

4 Claims, 12 Drawing Sheets

(56) References Cited

FOREIGN PATENT DOCUMENTS

| | | | |
|---|---|---|---|
| JP | 07098007 | A | 4/1995 |
| JP | 08121442 | A | 5/1996 |
| JP | 2006247756 | A | 9/2006 |
| JP | 2017063070 | A | 3/2017 |
| TW | 200945463 | A | 11/2009 |
| TW | 201717291 | A | 5/2017 |
| WO | 2014178597 | A1 | 11/2014 |

OTHER PUBLICATIONS

English Abstract and Machine Translation for Japanese Publication No. JP 2006-247756 A, published Sep. 21, 2006, 20 pgs.
English Abstract and Machine Translation for Japanese Publication No. JP 2017-063070 A, published Mar. 30, 2017, 26 pgs.
English Abstract and Machine Translation for Japanese Publication No. JP 1995(H07)-098007 A, published Apr. 11, 1995, 11 pgs.
English Abstract and Machine Translation for Japanese Publication No. JP 1996(H08)-121442 A, published May 14, 1996, 57 pgs.
English Abstract and Machine Translation for Japanese Publication No. JP 1993(H05)-012827 U, published Feb. 19, 1993, 11 pgs.

\* cited by examiner

ASSEMBLY MEMBER PRODUCTION METHOD INCLUDING STEP FOR FITTING PROTRUDING PART AND RECESSED PART

RELATED APPLICATIONS

This application is a 35 U.S.C. 371 national phase filing from International Application No. PCT/JP2021/021079, filed Jun. 2, 2021, the contents of which are incorporated herein by reference.

TECHNICAL FIELD

The present invention relates to an assembly member manufacturing method that includes a step of fitting a protrusion and a recess.

BACKGROUND ART

In a manufacturing method of an apparatus, one member and another member may be fixed to each other after the other member is aligned with the one member. It is also known that when two members are to be aligned, a protrusion is formed at one member and a recess is formed at the other member. By inserting the protrusion into the recess, the other member can be easily aligned relative to the one member. In other words, it is known to use a spigot structure. For example, when two members are to rotate around a rotation axis, a protrusion and a recess are formed so as to extend along the rotation axis. By fitting the protrusion of one member to the recess of the other member, the alignment of the one member with the other member can be easily performed.

In the conventional art, it is known that a film like a diamond-like carbon film is formed on a surface of a recess and a surface of a protrusion so as to reduce friction when inserting the protrusion into the recess (e.g., Japanese Unexamined Patent Publication No. 2006-247756A and Japanese Unexamined Patent Publication No. 2017-63070A).

CITATION LIST

Patent Literature

[PTL 1] Japanese Unexamined Patent Publication No. 2006-247756A
[PTL 2] Japanese Unexamined Patent Publication No. 2017-63070A

SUMMARY OF INVENTION

Technical Problem

In the case of aligning members by forming a protrusion in one member and a recess in the other member, accurate alignment cannot be performed when a gap occurs between the protrusion and the recess. In order to achieve accurate alignment, it is preferable that the protrusion fit precisely into the recess. In other words, it is preferable to form a recess and a protrusion of a size whereby the protrusion adheres closely to the recess. On the other hand, when the recess and the protrusion are fitted together, it may be difficult for them to be inserted relative to each other coaxially, and thus difficult to fit each other.

In order to facilitate fitting of the protrusion to the recess, a tapered chamfered portion can be provided at the corner of the top surface of the protrusion and at the corner of the tip of the recess. The chamfered portion makes it easier for the recess and the protrusion to fit together. However, when the protrusion is inserted into the recess along the tapered shape, the protrusion may be inserted at an angle. In addition, there are cases where two members are fixed with the protrusion tilted against the recess. As a result, the two members are fixed while an unnecessary force is applied to each member. Subsequently, the forces remaining inside the members may adversely affect the apparatus containing the respective members or the apparatus connected to the members.

Solution to Problem

An aspect of the present disclosure is a manufacturing method of an assembly member by fitting a protrusion of a first member and a recess of a second member. The protrusion and the recess have similar shapes to each other and have sizes such that a gap is formed between a side surface of the protrusion and a side surface of the recess when the protrusion is fitted into the recess. The manufacturing method includes arranging, on at least one from among the side surface of the protrusion and the side surface of the recess, a protective agent that can be released to outside after assembling the second member to the first member. The manufacturing method includes fitting the protrusion and the recess so as to assemble the second member to the first member, and fixing the first member and the second member to each other by a fastening member. The manufacturing method includes releasing the protective agent to the outside so as to form the gap between the protrusion and the recess, the protective agent being arranged between the side surface of the protrusion and the side surface of the recess.

Advantageous Effect of Invention

According to an aspect of the present disclosure, a manufacturing method of an assembly member with a gap between a protrusion and a recess can be provided.

DESCRIPTION OF EMBODIMENTS

A manufacturing method of an assembly member according to an embodiment will be described with reference to FIGS. 1 to 12. An assembly member is manufactured by assembling a plurality of members. In the assembly member according to the present embodiment, a first member with a protrusion and a second member with a recess are combined and fixed by a fastening member. In this case, the second member is aligned relative to the first member by fitting the protrusion and the recess together. In other words, the alignment of the two members is performed by the spigot structure.

Figure 1:
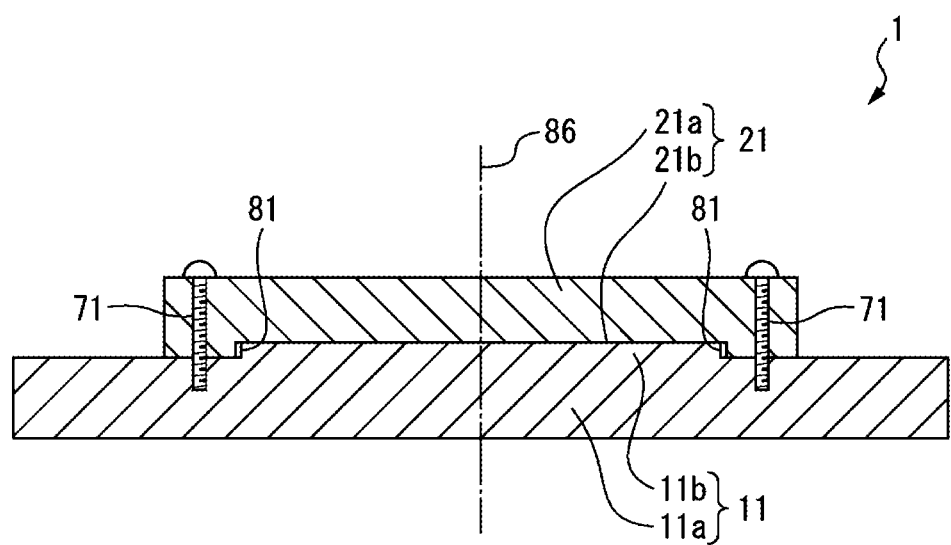
FIG. 1 is a cross-sectional view of a first assembly member according to an embodiment.
Figure 2:
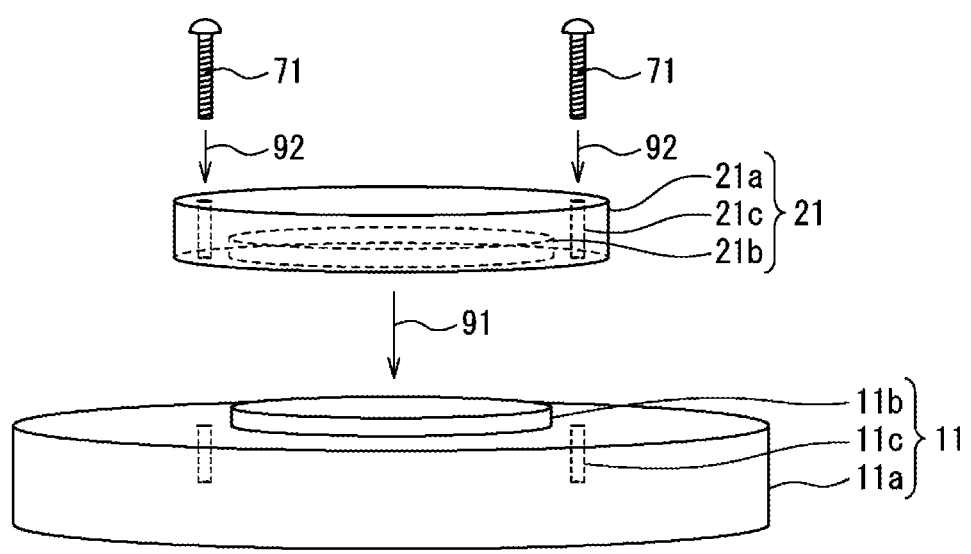
FIG. 2 is an exploded perspective view of a first assembly member according to an embodiment.

FIG. 1 is an enlarged cross-sectional view of a first assembly member according to the present embodiment. FIG. 2 is an exploded perspective view of the first assembly member according to the present embodiment. Referring to FIGS. 1 and 2, a first assembly member 1 includes a first member 11 and a second member 21. The first member 11 and the second member 21 are fixed to each other by a bolt 71 serving as a fastening member. The fastening member is not limited to a bolt, but can be any member for fixing the first member 11 and the second member 21.

The first member 11 includes a disc-shaped plate portion 11a and a protrusion 11b protruding from a surface of the plate portion 11a. The first member 11 is formed with a hole 11c to which the bolt 71 is fixed. The second member 21 includes a disc-shaped plate portion 21a. The plate portion 21a is formed with a recess 21b recessed from a surface of the plate portion 21a. The second member 21 includes a hole 21c through which the bolt 71 is inserted.

The protrusion 11b and the recess 21b have similar shapes to each other. In particular, the side surface of the protrusion 11b and the side surface of the recess 21b have similar shapes to each other. In this example, the protrusion 11b and the recess 21b each have a cylindrical shape. The recess 21b is formed larger than the protrusion 11b. The protrusion 11b and the recess 21b have such sizes so as to form a gap 81 between the side surface of the protrusion 11b and the side surface of the recess 21b.

Referring to FIGS. 1 and 2, in the manufacturing method of an assembly member according to the present embodiment, the protrusion 11b and the recess 21b are fitted by moving the second member 21 relative to the first member 11 as illustrated in arrow 91. After this, the bolt 71 is inserted into the hole 21c of the second member 21 and the hole 11c of the first member 11, as illustrated in arrow 92. Subsequently, the bolt 71 fixes the second member 21 to the first member 11.

Figure 3:
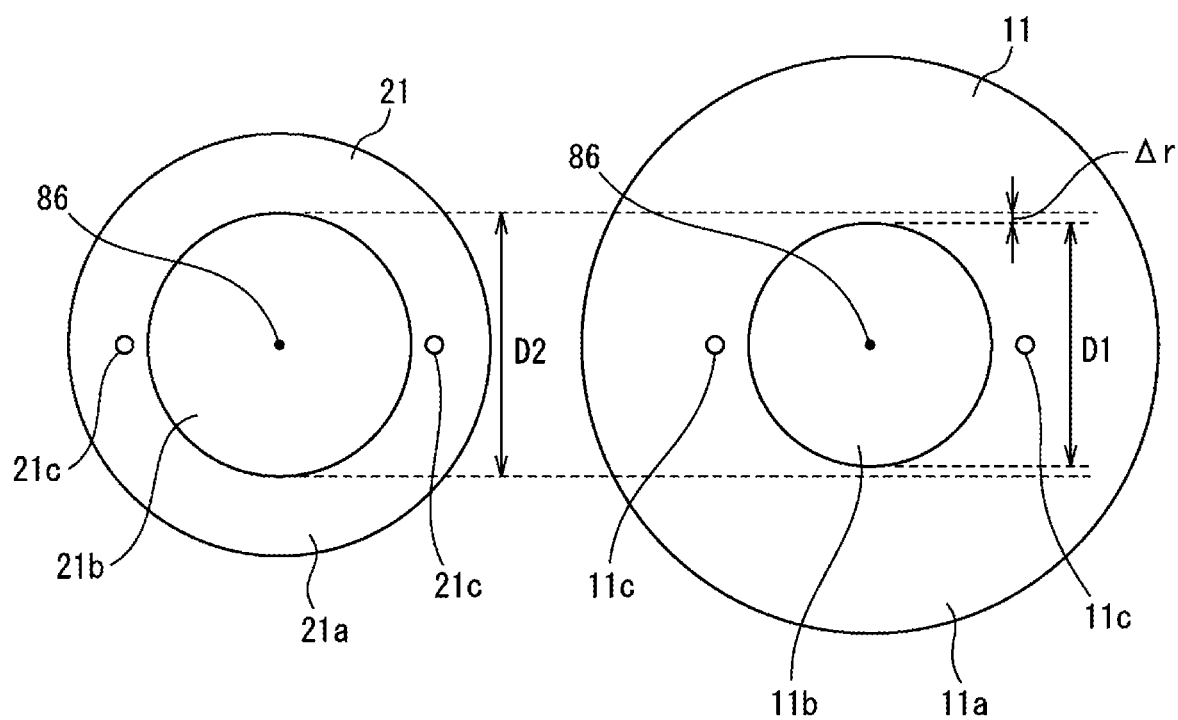
FIG. 3 is a plan view of a first member and a second member according to an embodiment, which are arranged side by side.

FIG. 3 is a plan view of the first member and the second member when the first member and the second member are arranged side by side. The planar shape of circle in the protrusion 11b of the first member 11 has a diameter D1. In other words, the outer diameter of the protrusion 11b is D1. The planar shape of circle in the recess 21b of the second member 21 has a diameter D2. In other words, the inner diameter of the recess 21b is D2. The diameter D2 is larger than the diameter D1 so that the gap 81 is formed between the protrusion 11b and the recess 21b. The difference in radius $\Delta r$ ((D2−D1)/2), which is ½ of the difference between the diameter D1 and the diameter D2, corresponds to the width of the gap 81. In addition, the difference $\Delta r$ corresponds to the thickness of a coating agent arranged as a protective agent to be described below.

Referring to FIGS. 1 to 3, the assembly member 1 is a member that rotates around a rotation axis 86. In the present embodiment, the center of the planar shape circle of the protrusion 11b and the center of the planar shape circle of the recess 21b are fixed so as to pass through the rotation axis 86. In this way, the first member 11 and the second member 21 are fixed to each other so that the position of the second member 21 is determined relative to the first member 11. In particular, the first member 11 and the second member 21 are fixed to each other so that the first member 11 and the second member 21 are positioned relative to the rotation axis 86.

In the manufacturing method of an assembly member 1, the worker performs a preparatory step of manufacturing the first member 11 and the second member 21. In this case, the first member 11 and the second member 21 are formed so that the surface of the protrusion 11b and the surface of the recess 21b have similar shapes to each other. In this example, each of the protrusion 11b and the recess 21b is formed in a cylindrical shape. In this case, either the height of the protrusion 11b or the depth of the recess 21b may be larger than the other. Alternatively, the height of the protrusion 11b and the depth of the recess 21b may be identical to each other.

The protrusion 11b and the recess 21b are formed so that the difference $\Delta r$ of radius in the planar shape between the protrusion 11b and the recess 21b is larger than the difference when a protrusion and a recess are fitted in a normal clearance fit. When performing the normal clearance fit, a protrusion and a recess are formed so that ½ of the difference between the outer diameter of the protrusion and the inner diameter of the recess is, for example, 0.035 mm or less. On the other hand, in the assembly member 1 according to the present embodiment, the protrusion 11b and the recess 21b can be formed so that ½ of the difference between the diameter D1 and the diameter D2 is, for example, from 0.05 mm to 0.15 mm. As a result of such a difference, the gap 81 can be formed between the side surface of the protrusion 11b and the side surface of the recess 21b when the protrusion 11b is fitted into the recess 21b.

Figure 4:
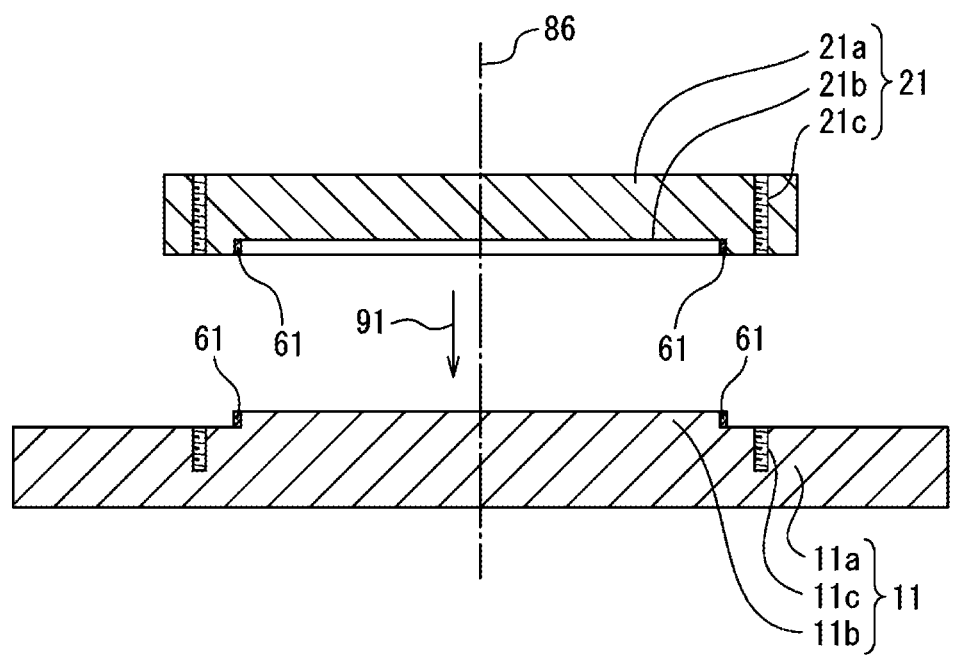
FIG. 4 is a cross-sectional view of the first member and the second member when a fitting step of a manufacturing method of an assembly member is performed.
Figure 5:
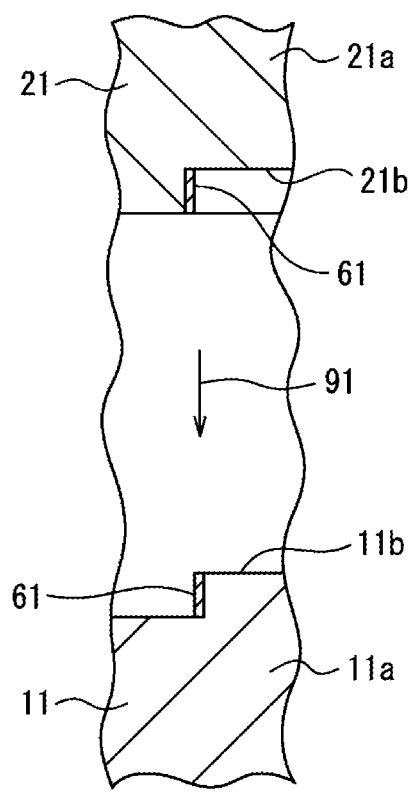
FIG. 5 is an enlarged cross-sectional view of the first member and the second member when the fitting step is performed.

FIG. 4 is a cross-sectional view illustrating an arranging step of arranging the protective agent according to the present embodiment. FIG. 5 illustrates an enlarged cross-sectional view of the side surface of the protrusion of the first member and the side surface of the recess of the second member in the arranging step. With reference to FIGS. 4 and 5, the worker places a coating agent 61 serving as a protective agent at a predetermined thickness on each of the side surface of the protrusion 11b of the first member 11 and the side surface of the recess 21b of the second member 21. The coating agent 61 has a function of protecting the side surface of the protrusion 11b and the side surface of the recess 21b in the manufacturing step. The coating agent 61 can be adopted, which can be discharged to the outside after assembling the second member 21 to the first member 11 and has the property of disappearing from the gap 81. In this example, the coating agent 61 is used, which forms a coating film by being arranged on at least one from among the side surface of the protrusion and the side surface of the recess and has the property of vaporizing by being heated. As the coating agent, for example, a room-temperature fluororesin coating agent can be adopted. This coating agent has a low boiling point and is coated at room temperature, as well as the property of vaporizing by being heated.

The thickness of the coating agent 61 arranged at the side surface of the recess 21b and the side surface of the protrusion 11b is defined to fill the gap 81 of the assembly member 1. In this example, the thickness of the coating agent 61 is determined so that the sum of the thickness of the coating agent 61 arranged on the side surface of the protrusion 11b and the thickness of the coating agent 61 arranged on the side surface of the recess 21b is the difference Δr between the radius of the protrusion 11b and the radius of the recess 21b. For example, the coating agent 61 is arranged on the side surface of the recess 21b and on the side surface of the protrusion 11b so that each thickness is Δr/2.

The coating agent 61 is arranged with a constant thickness in the circumferential direction. As a method of arranging the coating agent at a predetermined thickness, a spray coater application method can be exemplified. In this method, a coating film with a predetermined thickness can be formed by spraying an atomized coating agent onto an object by using an air spray, an ultrasonic spray, or the like.

In the present embodiment, the coating agent 61 is arranged on both of the side surface of the protrusion 11b of the first member 11 and the side surface of the recess 21b of the second member 21, but the embodiment is not limited to this. The protective agent may be arranged on at least one from among the side surface of the protrusion and the side surface of the recess. In other words, the protective agent may be arranged on one of the side surface of the protrusion or the side surface of the recess. The thickness of the protective agent in this case is thickness (Δr) that is equivalent to the width of the gap 81.

Figure 6:
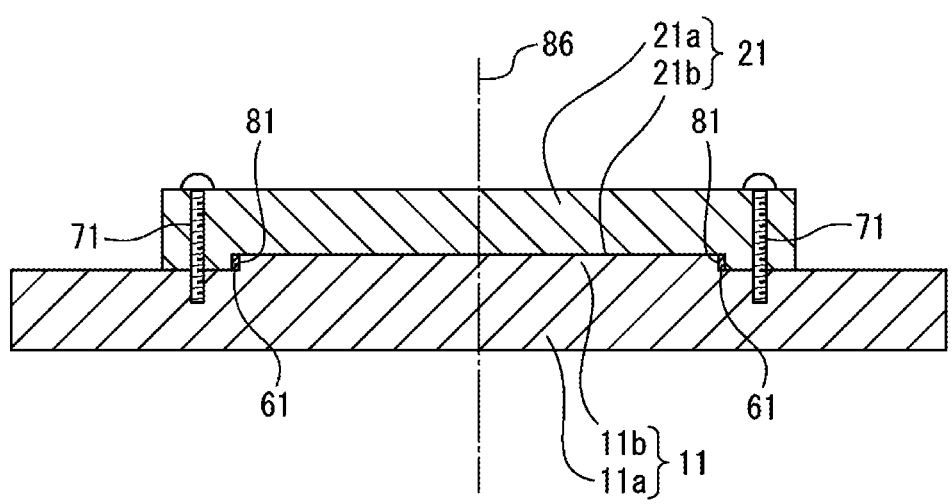
FIG. 6 is a cross-sectional view of the first member and the second member when the fitting step and a fixing step are performed.

FIG. 6 is a cross-sectional view of the first member and the second member illustrating a fitting step and a fixing step in the manufacturing method according to the present embodiment. Referring to FIGS. 4 to 6, the second member 21 is moved relative to the first member 11 as illustrated in arrow 91. The fitting step of fitting the protrusion 11b and the recess 21b and assembling the second member 21 to the first member 11 is performed. Immediately after the fitting step, the gap 81 has been filled with the coating agent 61.

In the fitting step, the coating agent 61 is arranged on the side surface of the protrusion 11b and the side surface of the recess 21b. Interposition of the coating agent 61 between the protrusion 11b and the recess 21b suppresses the protrusion 11b from being inserted at an angle into the recess 21b. Furthermore, since the gap 81 is filled with the coating agent 61 having a constant thickness, the alignment of the second member 21 relative to the first member 11 can be performed with high accuracy. In this example, the first member 11 and the second member 21 can be aligned so that the protrusion 11b and the recess 21b are coaxially aligned.

Subsequently, a fixing step of fixing the first member 11 and the second member 21 to each other by the bolt 71 is performed. The bolt 71 is inserted into the hole 21c of the second member 21 and the hole 11c of the first member 11. By tightening the bolt 71, the position of the second member 21 relative to the first member 11 is fixed.

Subsequently, a release step is performed for releasing the coating agent 61 to the outside, which is arranged between the side surface of the protrusion 11b of the first member 11 and the side surface of the recess 21b of the second member 21. By releasing the coating agent 61 to the outside, the gap 81 is formed between the protrusion 11b and the recess 21b. In this example, the coating agent 61 is vaporized by being heated.

In the present embodiment, the fitting portion between the protrusion 11b and the recess 21b is heated by an industrial dryer. The coating agent 61 is vaporized and discharged to the outside by being heated. The coating agent 61 disappears from the space between the side surface of the protrusion 11b and the side surface of the recess 21b. As a result, the gap 81 is formed between the protrusion 11b and the recess 21b, as illustrated in FIG. 1.

Thus, in the manufacturing method of an assembly member according to the present embodiment, the first member and the second member are formed of such a dimension that the gap is formed between the side surface of the protrusion and the side surface of the recess. The protective agent is arranged on the side surface of the protrusion and on the side surface of the recess with a thickness corresponding to the width of the gap. After the protrusion and the recess are fitted, the first member and the second member are fixed with a fastening member. Subsequently, by heating the protective agent, the protective agent can be discharged to the outside so as to form the gap between the protrusion and the recess.

Figure 7:
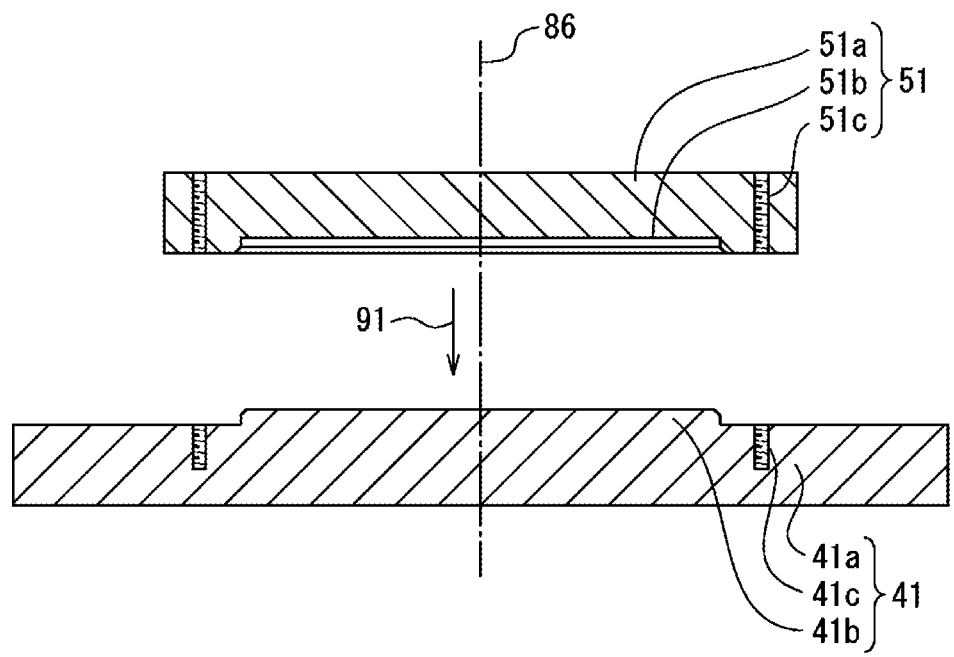
FIG. 7 is a cross-sectional view illustrating a fitting step of a manufacturing method of an assembly member according to a comparative example.
Figure 8:
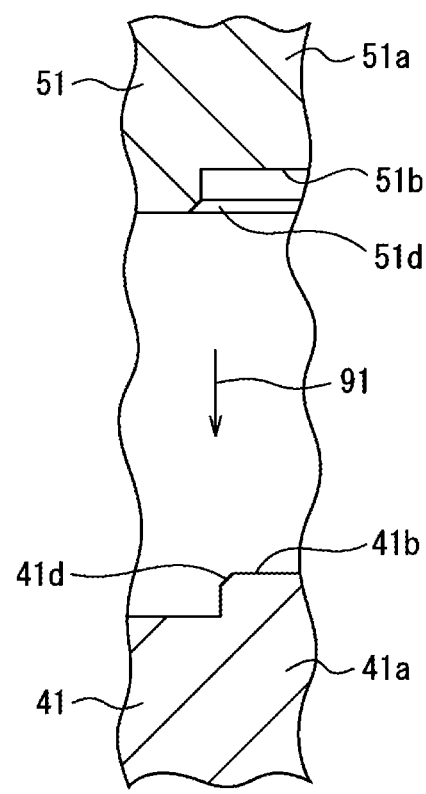
FIG. 8 is an enlarged cross-sectional view illustrating a fitting step of a manufacturing method of an assembly member according to a comparative example.

FIG. 7 is a cross-sectional view illustrating a method of assembling the second member to the first member in the comparative example. FIG. 8 illustrates an enlarged cross-sectional view of the first member and the second member in the comparative example. Referring to FIGS. 7 and 8, also in the comparative example, a second member 51 is moved and fitted relative to a first member 41 as illustrated in arrow 91. The first member 41 includes a plate portion 41a, a protrusion 41b, and a hole 41c to which the bolt is fixed. The second member 51 includes a plate portion 51a, a recess 51b, and a hole 51c through which the bolt is inserted.

The first member 41 includes a chamfered portion 41d formed at the top surface of the protrusion 41b. A chamfered portion 51d is formed in the part where the recess 51b of the second member 51 is formed. Thus, the chamfered portions 41d and 51d are formed so that the corners are not pointed. In the assembly member according to the comparative example, for example, fitting is performed by a clearance fitting.

In the assembly member according to the comparative example, by forming chamfered portions at the corners, the members move along the chamfered portions, making it easier to fit the recess 51b to the protrusion 41b. However, the second member 51 may tilt relative to the first member 41 during the period when the protrusion 41b is inserted inside the recess 51b. Subsequently, there are cases where the first member 41 and the second member 51 are fixed to each other with the second member 51 tilted relative to the first member 41.

In addition, contact between the side surface of the recess 51b and the side surface of the protrusion 41b may apply excessive force between the recess 51b and the protrusion 41b. Subsequently, the fixing may occur with excessive force between the recess and the protrusion applied. In this case, the stress may remain inside the first member or the second member, which may adversely affect the apparatus including the first member or the second member.

Referring to FIGS. 4 to 6, in contrast to this, in the manufacturing method of the assembly member 1 according to the present embodiment, the fitting is performed with the coating agent 61 arranged between the side surface of the recess 21b and the side surface of the protrusion 11b. Thus, direct contact between the side surface of the recess 21b and the side surface of the protrusion 11b can be avoided, as can excessive force and scratching therebetween.

In addition, the alignment of the second member 21 relative to the first member 11 can be performed with high accuracy because of arranging the protective agent with a thickness corresponding to the width of the gap 81. In particular, according to the present embodiment, the alignment of the first member 11 and the second member 21 relative to the rotation axis 86 can be performed with high accuracy. It is also possible to suppress the second member 21 from being fixed in the state in which the second member 21 is tilted relative to the first member 11. It is possible to avoid that the second member 21 is fixed by tilting relative to the first member 11 to result in the fixed state with a force acted at each member. Furthermore, in the assembly member 1, the gap 81 is formed between the side surface of the recess 21*b* and the side surface of the protrusion 11*b*, thereby ensuring that the force to act between the recess 21*b* and the protrusion 11*b* is avoided. In other words, stress can be avoided to remain inside at least one from among the first member 11 and the second component.

The protective agent according to the present embodiment has the property of forming a coating film by being arranged on at least one from among the side surface of the protrusion and the side surface of the recess and of vaporizing by being heated, but it is not limited to this form. The protective agent may have the property of forming a coating film by being arranged on at least one from among the side surface of the protrusion and the side surface of the recess and of liquefying by being heated. As such a coating agent, for example, a powder coating agent using a thermoplastic resin with a low melting point can be adopted. A powder coating method can be employed as a method of arranging the coating agent at a predetermined thickness. According to this method, a coating film of a predetermined thickness can be formed by attaching a powder coating agent to an object and heating the agent to a high temperature.

Figure 9:
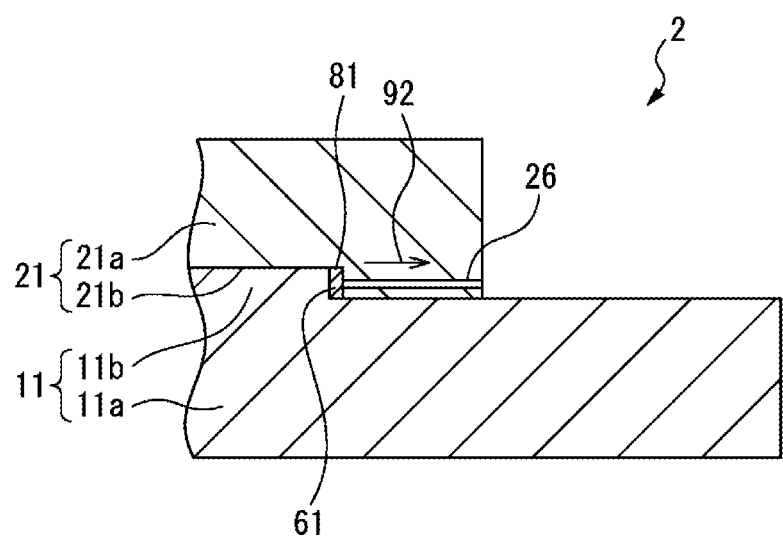
FIG. 9 is an enlarged cross-sectional view of a second assembly member with a communication hole communicating with a gap.

FIG. 9 is an enlarged cross-sectional view of a second assembly member according to the present embodiment. In a second assembly member 2, the second member 21 includes a communication hole 26 serving as a communication path connecting the gap 81 to the outside. By heating in the release step, the vaporized or liquefied coating agent 61 can be discharged to the outside through the communication hole 26 as illustrated in arrow 92. Thus, the coating agent 61 filled in the gap 81 can be rapidly discharged to the outside through the communication hole 26. Alternatively, the coating agent 61 may be discharged to the outside by sucking the coating agent 61 through the communication hole 26 by using a suction apparatus.

In the example illustrated in FIG. 9, the communication hole 26 is formed in the second member 21, but it is not limited to this form. The communication path communicating from the gap to the outside can be formed in at least one from among the first member and the second member. In addition, the communication path is not limited to the above communication hole but is only required to have a configuration that communicates with the gap to the outside. For example, instead of the above communication hole, an elongated tube may be inserted into the second member.

In the above-described assembly member, the planar shapes of the protrusion and the recess are each formed to be a circle, but it is not limited to this form. The planar shape of the protrusion and the recess can adopt various shapes.

Figure 10:
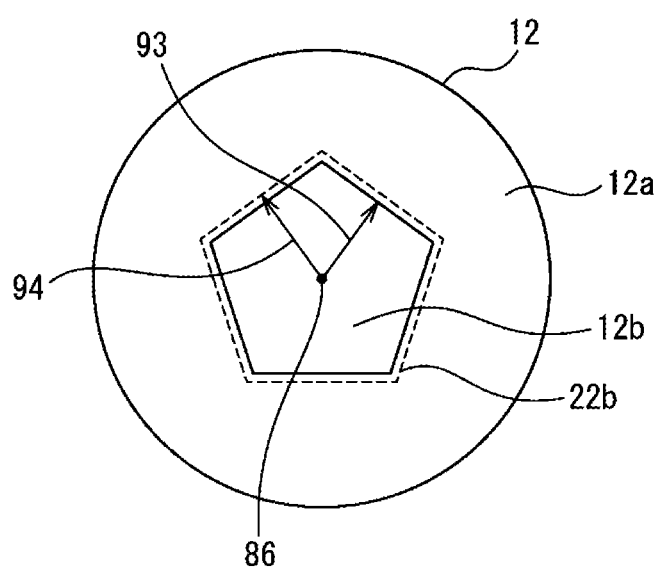
FIG. 10 is a plan view of a first member in an assembly member according to a first variation.

FIG. 10 is a plan view of a first member according to a first variation of the assembly member of the present embodiment. The first member 12 in the first variation includes a plate portion 12*a* and a protrusion 12*b*. A polygon can be adopted as the planar shape of the protrusion. For example, a regular polygon can be adopted as the planar shape of the protrusion. In this example, the planar shape of the protrusion 12*b* is a regular pentagon. In FIG. 10, the planar shape of a recess 22*b* of the second member is illustrated by a broken line. The shape of the recess 22*b* is similar to the shape of the protrusion 12*b*.

Even when each of the planar shape of the protrusion and the planar shape of the recess is formed by a polygon, a gap with a predetermined width can be formed between the protrusion and the recess. The recess 22*b* is formed larger than the protrusion 12*b*. In the manufacturing method of an assembly member, the protective agent can be arranged so that the difference between the apothem of the protrusion 12*b* illustrated by arrow 93 and the apothem of the recess 22*b* illustrated by arrow 94 corresponds to the thickness of the protective agent.

Figure 11:
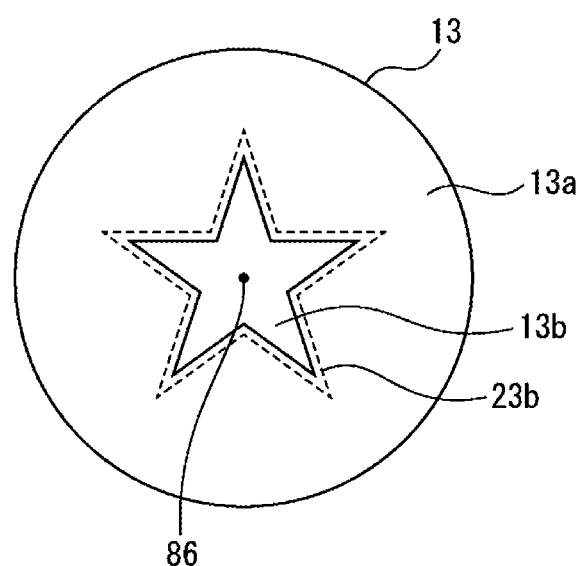
FIG. 11 is a plan view of a first member in an assembly member according to a second variation.

FIG. 11 is a plan view of a first member according to a second variation of the assembly member of the present embodiment. A first member 13 according to the second variation includes a plate portion 13*a* and a protrusion 13*b*. The protrusion 13*b* is formed in a star-shaped planar shape. A recess 23*b* of the second member is indicated by a broken line. The recess 23*b* of the second member has a similar shape to the protrusion 13*b* of the first member 13. The protrusion 13*b* and the recess 23*b* are formed to form a gap with a predetermined width. In the manufacturing method of an assembly member, the protective agent with a thickness, which fills the space between the protrusion 13*b* and the recess 23*b*, can be arranged. In the first variation and the second variation, the alignment can be performed so that the center of the gravity of each planar shape of the protrusion and the recess passes through the rotation axis 86.

Figure 12:
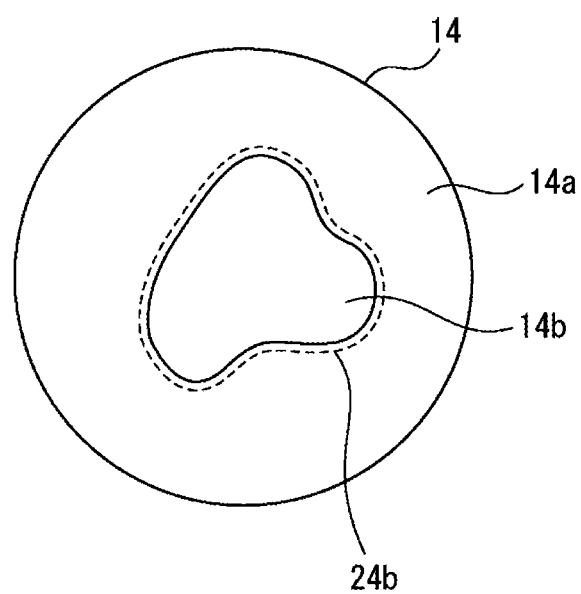
FIG. 12 is a plan view of a first member in an assembly member according to a third variation.

FIG. 12 is a plan view of a first member according to a third variation of the assembly member of the present embodiment. A first member 14 according to the third variation includes a plate portion 14*a* and a protrusion 14*b*. The planar shape of the protrusion 14*b* is a shape without regularity. A recess 24*b* of the second member is indicated by a broken line. The recess 24*b* of the second member has a shape similar to the shape of the protrusion 14*b* of the first member 14. The protrusion 14*b* and the recess 24*b* are formed so as to form a gap of a predetermined width. In the manufacturing method, the protective agent with a thickness, which fills the space between the protrusion 14*b* and the recess 24*b*, can be arranged.

As shown in FIGS. 11 and 12, a protrusion and a recess each with a planar shape other than a circle and a polygon may be formed. The manufacturing method according to the present embodiment can be applied to an assembly member having a similar shape between the shape of the protrusion and the shape of the recess.

The protrusion and the recess according to the above embodiment are formed such that the cross-sectional shape is constant when cut by a plane perpendicular to the axial direction. For example, the protrusion 11*b* of the first member 11 is formed in a cylindrical shape, but it is not limited to this form. The protrusion and the recess are only required to have similar shapes to each other. For example, the cross-sectional shapes of the protrusion and the recess when cut by a plane parallel to the axial direction may be each formed in a tapered shape. For example, the protrusion and the recess may each be formed in a shape of a truncated cone or a circular cone.

In the manufacturing method described above, the order of the steps can be changed accordingly to the extent that the function and action are not changed.

The above embodiments can be combined as appropriate. In each of the above drawings, the same or equivalent parts are denoted by the same reference sign. The above embodiments are examples and do not limit the invention. The embodiments include modifications of the embodiments described in the claims.

REFERENCE SIGNS LIST 1,2 assembly member
11 to 14 first member
11b to 14b protrusion
21 second member
21b to 24b recess
26 communication hole
61 coating agent
71 bolt
81 gap

The invention claimed is:

1. A method of manufacturing an assembly member by fitting a protrusion of a first member and a recess of a second member,
the protrusion and the recess having substantially similar shapes to each other, the protrusion and the recess having sizes in such a manner that a gap is formed between a side surface of the protrusion and a side surface of the recess when the protrusion is fitted into the recess, the method comprising:
arranging, on at least one from among the side surface of the protrusion and the side surface of the recess, a protective agent configured to be released to an outside after of the assembly member after assembling the second member to the first member;
fitting the protrusion and the recess so as to assemble the second member to the first member;
fixing the first member and the second member to each other by a fastener; and
releasing the protective agent to the outside so as to form the gap between the protrusion and the recess, the protective agent being arranged between the side surface of the protrusion and the side surface of the recess.

2. The method of manufacturing the assembly member of claim 1,
wherein the protective agent forms a coating film on the at least one from among the side surface of the protrusion and the side surface of the recess, and the protective agent has a property of vaporizing by being heated, and
the releasing includes discharging the protective agent to the outside by heating.

3. The method of manufacturing the assembly member of claim 1,
wherein the protective agent forms a coating film on the at least one from among the side surface of the protrusion and the side surface of the recess, and the protective agent has a property of liquefying by being heated, and
the releasing includes discharging the protective agent to the outside by heating.

4. The method of manufacturing the assembly member of claim 1,
wherein at least one from among the first member and the second member includes a communication path configured to communicate from the gap to the outside, and
the releasing includes discharging the protective agent to the outside through the communication path.

* * * * *